United States Patent Office.

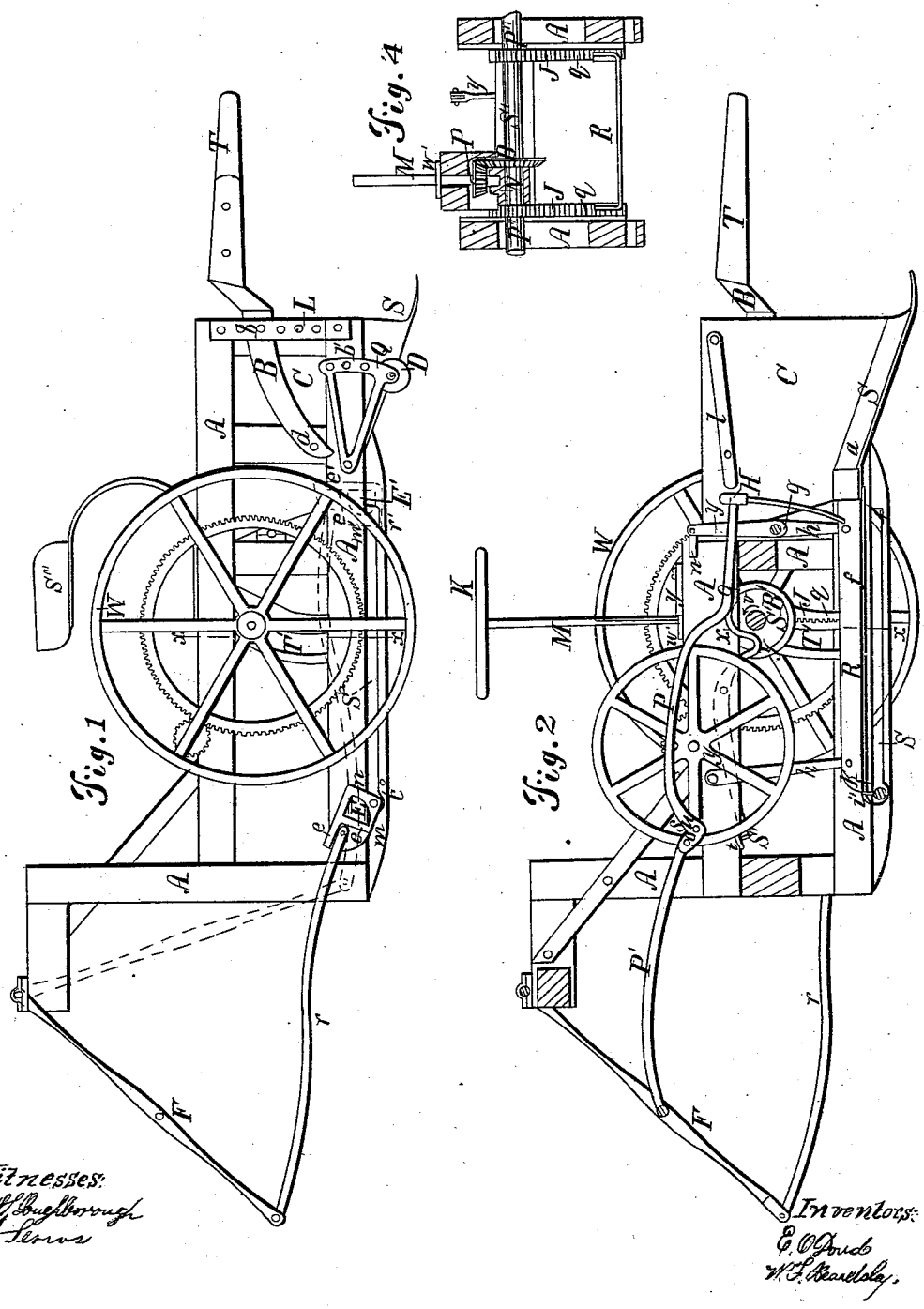

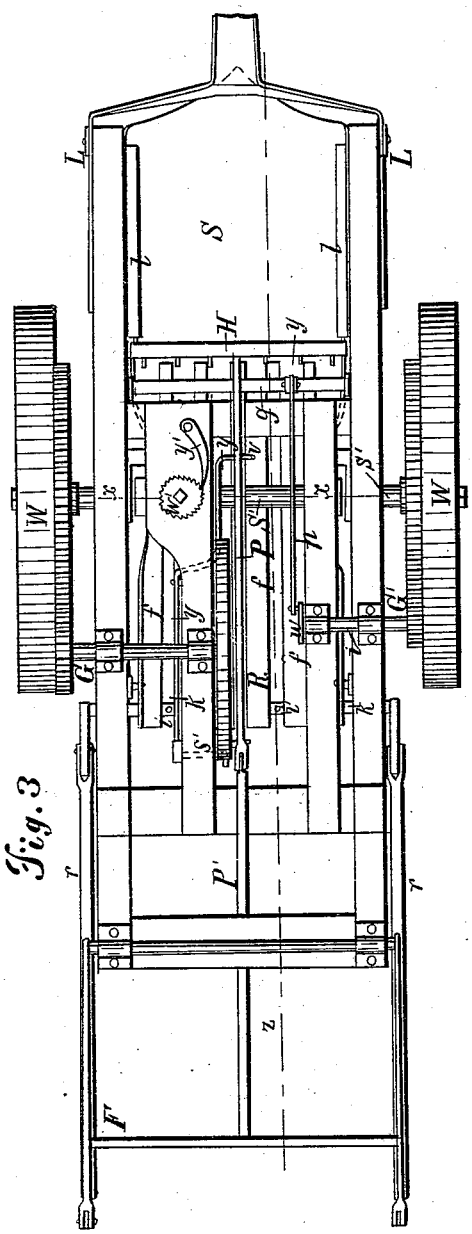

E. O. DOUD AND W. F. BEARDSLEY, OF PENFIELD, NEW YORK.

*Letters Patent No. 64,291, dated April 30, 1867*

POTATO-DIGGER.

*The Schedule referred to in these Letters Patent and making part of the same.*

TO ALL WHOM IT MAY CONCERN:

Be it known that we, E. O. DOUD and W. F. BEARDSLEY, of Penfield, in the county of Monroe, and State of New York, have invented certain new and useful improvements in "Potato-Diggers;" and we do hereby declare that the following is a full, clear, and exact description thereof, reference being had to the accompanying drawings, making part of this specification, in which—

Figure 1, (sheet A,) is a side elevation of our invention.
Figure 2 is a vertical section, taken in the plane indicated by the red line $z$ in fig. 3.
Figure 3, (sheet B,) is a top view of the machine.
Figure 4 is a rear view or transverse section, taken in the plane of the red line $x$ in figs. 1, 2, and 3.
Similar letters indicate like parts.

The nature of this invention will be better understood by reference to the drawings and specification.

To enable others to make and use our invention, we will describe its construction and operation.

We provide a suitable frame, A, to the front end of which is rigidly bolted the plough or shovel S. The turned-up sides, $a$, of the plough are somewhat contracted at the rear. There may be a metallic casing or side, C, extending from front to rear at each side of the plough. The brace-bars B, to which the pole or tongue T is attached, are bolted to the frame at $b$ and $d$ on the outside. The bars B may have an additional support by passing through the loops L, (fig. 1.) The traverse or gauge-wheels D are attached to the side of the frame, as shown in fig. 1. There is a raddle or screen, R, composed of flat strips of metal, or other suitable material, running longitudinally, as seen in fig. 3, the interstices being unobstructed by cross-bars. These slats $f$ of the raddle are attached to a cross-bar at the front end, which is always covered by the rear edge of the shovel blade. The rear ends of the slats are curved under and returned forward a short distance, and are connected together by a suitable lateral brace or bar. The raddle is suspended upon four hanger-straps, $h$, the front two being rigidly attached to the rock-shaft $g$, by which it is given a longitudinal vibration or reciprocating motion. The shaft $g$ is driven from the right-hand ground or driving-wheel W, through the shaft $i$, fig. 3. The throw of the raddle may be varied by changing the point of connection between the pitman $p$ and arm $y$ of the rock-shaft, or changing the wrist-pin in the crank-wheel $w$. There is a cleaner-bar, $k$, figs. 2 and 3, arranged laterally under the raddle. This bar is provided with a series of fingers, $i$, corresponding with the spaces between the slats, and is attached to the head E at each end. The bar is supported at each end in a slot, $s$, in the frame A, and it is reciprocated by the connecting-rods $r$, attached to the swinging frame F. There is a slight depression at each end of the slots $s$ into which the bar $k$ drops. The rods $r$ are connected to the heads E, as shown in fig. 1, there being a rib or stop, $e$, to limit the rock or roll of the shaft or bar $k$ either way. When the rods $r$ begin the return stroke from the position shown in fig. 1, the heads E are turned in the position shown by the dotted lines E', causing the point $n$ to strike the pin $e$, and thereby lifting the bar out of the notch, turning the fingers $i'$ forward, and allowing it to be carried back to the front end, when the bar $k$ again catches in the depressions $r'$, and as the return stroke commences the heads E are drawn back to the position of the full lines, the face $m$ strikes a lifter pin at that end, which raises the bar from the depression $r'$, and, as a matter of course, the cleaner pins $i'$ are again thrown up between the slats, and they effectually remove anything that might otherwise lodge therein. The frame F is reciprocated by the pitman P', which is connected to the shank $o$ of the pitman P. This latter is jointed to the fly-wheel Y at $u$ by an ordinary wrist-pin. There is a heavy rake or "hook" attached to the outer end of this pitman. The head H is made to reach nearly from side to side of the machine, and as it is drawn back to its present position, as shown in fig. 2, the pitman is caught by the rest $r$ (figs. 2 and 3) of the bent lever $y$, and before the wrist-pin shall have passed the centre sufficiently to begin to carry the hook forward, the pin or tappet $t$ strikes the shank $s'$ of said lever $y$ and carries it down so far as to throw the head H of the rake upon the ways $l$, which are bolted to the sides of the machine, as seen in figs. 2 and 3. When the hook reaches its extreme forward throw, the ends of the head H pass over the end of the ways, and the hook falls into the earth or hill which has accumulated upon the shovel, and as it makes its rear stroke again carries the substance with it, delivering the same upon the raddle, where the separation is entirely and completely effected. During the backward stroke of the hook, the pitman P' being attached to the pitman P at a point above a direct line, the effect is to produce a downward pressure upon the hook, because the pitman P has to drive the frame F and the cleaner $k$ in the opposite direction. This influence upon the hook may be increased or diminished, if desired, by connecting P' further from or nearer to the wrist-pin. The ground-wheels W are hung loosely to the shaft S', but the pinions P'' and the bevel-wheel B' are keyed to the shaft, or otherwise rigidly attached. The toothed stirrups or yokes J are securely bolted to the frame A, and they encircle the shaft S', holding the pinions P'' in gear with the toothed racks $q$ of the yokes. The box N on the shaft S' constitutes the step for the lower end of the hand-wheel shaft M, as shown in fig. 4. The lower portion of this shaft is squared and fitted to slide loosely through the ratchet-wheel $w'$. The pinion $p'$ is rigidly fixed to the shaft M, and by turning the hand-wheel K to the right, the shaft S' will be turned as indicated by the arrow on the bevel-wheel in fig. 2, and the pinions P'' gearing into the toothed segment of the yokes J, the whole machine is raised, and the desired elevation is retained by the pawl $y'$, figs. 2 and 3. The slots or tracks T' in the yoke, for the shaft S' to move in, run up nearly or quite vertically, about half way, and then they should be made in the arc of a circle, having the axis of the pinions G and G' for their centre, whereby the elevation of the machine may be varied without throwing it out of gear until it is raised out of the ground entirely.

There might be times when it would be desirable to give the shovel S a sort of dipping motion, in order to dig deeper under the hills than elsewhere, and this may be effected by removing the bolts $b$ and placing them above the bar B; then, when the shovel is just entering under the hill, the traverse or ground-wheels D will be on the low ground between the hills, and as the wheels rise upon the sides of the hill, the plough is thrown up or raised more or less between the hills  By changing sides with the roller-stocks Q, they may be made to run in the trough between the rows of hills.

The seat S''' may be arranged as shown in fig. 1, or at any other convenient point. It is not shown in fig. 3, neither is the hand-wheel K.

Instead of the rotating cleaner $k$, it may be desirable to carry it forward on lower ways, and backward on elevated ones, so as to throw the fingers $i'$ into and out of the interstices of the raddle.

What we claim as our invention, and desire to secure by Letters Patent, is—

1. In combination with the shovel S, the reciprocating hook H, arranged and operating substantially as shown and described.

2. Raising the head of the hook H upon the ways $l$ by means of the pivoted lever $y$, which is operated by the pin or tappet $t$, substantially as and for the purpose set forth.

3. Attaching the pitman P' to the shank $o$, as shown, for the purpose of producing a gentle pressure or force, through the pitman P', upon the rake-head, the wrist-pin $u$ acting as a fulcrum to effect it.

4. In combination with the longitudinally reciprocating raddle or separator R, the reciprocating cleaner $k$, constructed, arranged, and operating substantially as and for the purposes set forth.

5. The heads E, constructed as shown and described, in combination with the pitmen $r$, depressions $r'$, and pins $c$, all operating conjointly, as shown and described, for the purpose of rotating the cleaner $k$.

6. The sinuous slot T', and racks $q$, in combination with the shaft S' and pinions P'', for the purpose of raising or lowering the machine and at the same time retaining the pinions G and G' in gear with the spur-wheels of the ground-wheels after the machine is lowered sufficiently to put them into gear, as set forth.

7. The sinuous slot T' in the stocks or yokes J, as shown, and for the purposes set forth.

8. The arrangement of the hand-wheel K, shaft M, ratchet and pawl $w'$ and $y'$, step-box N, pinion P, and bevel-wheel B', for the purpose of revolving the ground-wheel shaft S, and retaining the desired elevation or gauge of the machine.

9. The relative arrangement of the ground-rollers D, as shown, in combination with the shovel S and jointed or adjustable tongue T, in potato-diggers, for the purposes set forth.

E. O. DOUD,
W. F. BEARDSLEY.

Witnesses:
   WM. S. LOUGHBOROUGH,
   A. SENOSS.